(12) United States Patent
Huang et al.

(10) Patent No.: US 6,965,512 B2
(45) Date of Patent: Nov. 15, 2005

(54) FOLDING FRAME INCLUDING A ROTATABLE HOOK

(75) Inventors: King-Tung Huang, Taipei Hsien (TW); Hsin-Chien Wang, Taipei Hsien (TW); Chu-Hsian Chian, Taipei Hsien (TW); Chi-Min Hung, Taipei Hsien (TW); Yu-Jen Liu, Taipei Hsien (TW)

(73) Assignee: Winstron Corporation, Hsi-Chih (TW)

( * ) Notice: Subject to any disclaimer, the term of this patent is extended or adjusted under 35 U.S.C. 154(b) by 0 days.

(21) Appl. No.: 10/709,409

(22) Filed: May 3, 2004

(65) Prior Publication Data

US 2005/0168923 A1     Aug. 4, 2005

(30) Foreign Application Priority Data

Feb. 3, 2004    (TW) .............................. 93102415 A

(51) Int. Cl.⁷ ............................................. G06F 1/16
(52) U.S. Cl. ................................... 361/683; 292/251.5
(58) Field of Search ................................ 361/680–683; 16/255; 70/58, 158, 159; 292/251.5, 121

(56) References Cited

U.S. PATENT DOCUMENTS

| | | | | |
|---|---|---|---|---|
| 6,125,040 A | * | 9/2000 | Nobuchi et al. | 361/726 |
| 6,517,129 B1 | * | 2/2003 | Chien et al. | 292/251.5 |
| 6,628,509 B2 | * | 9/2003 | Kono | 361/681 |
| 6,659,516 B2 | * | 12/2003 | Wang et al. | 292/251.5 |

* cited by examiner

*Primary Examiner*—Lynn Feild
*Assistant Examiner*—Anthony Q. Edwards
(74) *Attorney, Agent, or Firm*—Winston Hsu

(57) ABSTRACT

A folding frame includes an upper body, a lower body, a fixing device disposed on the upper body, a hook rotatably coupled to the lower body, and a fastener for rotating the hook opposite to the lower body. The fastener comprises a shaft of which a first end is coupled to the hook, a spring of which a first end is coupled to a second end of the shaft, and a latch pin capable of moving the spring thereby moving the shaft for rotating the hook, and of which a first end of the latch pin is coupled to a second end of the spring. The hook is unhooked from the fixing device when the hook is rotated into the lower body, and the hook is engaged with the fixing device when the hook is rotated out from the lower body.

23 Claims, 8 Drawing Sheets

FOLDING FRAME INCLUDING A ROTATABLE HOOK

BACKGROUND OF INVENTION

1. Field of the Invention

The present invention relates to a folding frame, and more particularly, to a folding frame with a rotatable hook capable of engaging with a fixing device to fasten the folding frame.

2. Description of the Prior Art

Portability is an important feature of modern electronic products. One of the examples of is that the market for notebook computers enlarges continuously. The market of portable PCs also expands dramatically as the technology matures. Usually, there are a system module and a display module included in this kind of electronic product. The system module and the display module are included in an upper body and a lower body separately. The two bodies are often rotatably coupled together at one edge. In the prior art, for ensuring the fastening of the two bodies, a hook and a fastener are often disposed on the display module away from the edge at which the display module is rotatably coupled to the system module. A fixing device is set opposite to the hook on the system module. The hook and the fixing device can link with each other for fastening the display module and the system module when the two modules are closed together.

Please refer to FIG. 1. FIG. 1 is a perspective diagram of a prior art notebook computer 100. 110 is a display module of the notebook computer 100. 112 is a monitor. 120 is a system module of the notebook computer 100. The system module 120 includes a central processing unit (CPU), a memory module, a wireless module for transmitting signals wirelessly, and a bus interface for receiving and/or outputting signals from/to another system. The system module 120 further includes a user interface, such as a touch panel or a keyboard. 111 is a housing of the display module 110, and 121 is a housing of the system module 120. There is a hook 114 sticking out from the housing 111. 116 is a knob. A fixing device 124 is disposed on the housing 121 opposite to the hook 114. When the display module 110 and the system module 120 are shut together, the hook 114 and the fixing device 124 link with each other and ensure that the display module 110 and the system module 120 are shut tightly.

Please refer to FIG. 2. FIG. 2 is an exploded perspective diagram of some parts of the notebook computer 100 illustrated in FIG. 1. 111 is the housing of the display module 110 and only part of the housing 111 is shown in FIG. 2. The hook 114 has a rectangular shape with a hooked end. There is a slot 131 included in the lower part of the hook 114. 113 is a fastener capable of pushing the hook 114. The fastener 113 includes a knob 116 connecting with two shafts 132 and 133 which connect the two sides of the hook 114 separately, a spring 134 covering the shaft 133, and two positioning blocks 152 and 153. There are a hole 142 on the positioning blocks 152 and a hole 143 on the positioning block 153. The shaft 132 and the shaft 133 pass through the hole 142 and the hole 143 respectively. As shown in FIG. 2, there are insert-clips at the inner side of the knob 116 for engaging with the slot 131 through an opening 141 on the housing 111. Therefore the hook 114 may be pushed forward by the knob 116. 121 is the housing of the system module 120. Only part of the housing 121 is shown in FIG. 2. The fixing device 124 is matched with the hook 114 such that when the display module 110 and the system module 120 are shut, the hook 114 slides into the fixing device 124 smoothly. Furthermore, when the hook 114 slides into the fixing device 124, the restoring force of the spring 134 pushes the hook 114 back to the original position and makes the hooked end of the hook 114 engage with the fixing device 124. Consequently, the display module 110 and the system module 120 are fastened together. The user may push the knob 116 for pushing the hook 114 forward when separating the two modules 110 and 120 from closure. The hooked end of the hook 114 is withdrawn through the fixing device 124 and disengages from the fixing device 124 as a result. When the hook 114 is withdrawn through the fixing device 124 and the external pushing force of the knob 116 disappears, the restoring force of the spring 134 will push the hook 114 to the original position.

In the conventional notebook computer, the hook 114 and the fastener 113 may be assembled on the housing of the system module and the fixing device 124 on the housing of the display module. However, the hook 114 remains sticking out from the housing when the lower body and the upper body are separate. If the hook 114 and the fastener 113 are set on the housing of the system module, the sticking-out hook 114 will make the user uncomfortable and pose an inconvenience when the user uses the touch panel or the keyboard. Hence, in most cases, the hook and the fastener are disposed on the display module and fixing device is set on the housing of the system module as demonstrated in FIG. 1 and FIG. 2. However, as for modern portable PCs, the upper body may rotate 180 degree to connect to the lower body, which means both sides of the display module needs a hook and a fastener for connecting to the system module. Therefore, the thickness of the display module has to be increased for disposing hooks and fasteners on both sides. Please refer to FIG. 3. FIG. 3 a perspective diagram of a prior art portable PC. 300 is a portable PC. 310 is a display module of the portable PC 300. 312 is a monitor. 320 is a system module of the portable PC 300. 330 is a hinge connected the display module 310 and the system module 320, and the display module 310 may rotated around the hinge 330. 3141 is a hook at the monitor side and 3161 is a knob capable of pushing the hook 3141 forward. There is another hook 3142 (not shown in FIG. 3) on the reverse side of the monitor 312, and 3162 is a knob capable of pushing the hook 3142 forward. The portable PC 300 illustrated in FIG. 3 is closed with the monitor 312 exposed. As shown in FIG. 3, the hook 3141 at the monitor side sticks out. In fact no matter what side of the display module is connected to the system module, the hook on the other side sticks out uncomfortably and inconveniently. Furthermore, the prominent hook is easily broken by external force.

SUMMARY OF INVENTION

It is therefore a primary objective of the claimed invention to provide a folding frame with a rotatable hook that can hide the hook when the two bodies of the frame are opened.

Briefly described, the claimed invention discloses a folding frame with a rotatable hook. The folding frame includes an upper body, a lower body, a fixing device disposed on the upper body, a hook rotatably coupled to the lower body, and a fastener for rotating the hook opposite to the lower body. The fastener comprises a shaft of which a first end is coupled to the hook, a spring of which a first end is coupled to a second end of the shaft, and a latch pin capable of moving the spring thereby moving the shaft for rotating the hook, and of which a first end of the latch pin is coupled to a second end of the spring. In the claimed invention, the hook is unhooked from the fixing device when the hook is rotated into the lower body and the hook is engaged with the fixing device when the hook is rotated out from the lower body.

It is an advantage of the claimed invention that the hook is capable of being hidden inside the housing of the folding frame when the two bodies of the folding frame are opened. In the claimed invention, the hook may be rotated into the housing, hence the hook is not readily broken by external force and does not cause inconvenience to the user.

These and other objectives of the claimed invention will no doubt become obvious to those of ordinary skill in the art after reading the following detailed description of the preferred embodiment that is illustrated in the various figures and drawings.

DETAILED DESCRIPTION

The present invention utilizes a hook rotatably connected with a lower body of a folding frame and a fixing device disposed on an upper body of the folding frame for fastening the two bodies at closure. The hook is unhooked from the fixing device when being rotated into the lower body, and the hook is engaged with the fixing device when being rotated out from the lower body. In the invention, the discomfort caused by the exposed hook in the prior art is avoided, and the risk of the hook of being broken by unexpected external force is reduced. Furthermore, the design of the rotatable hook augments portable PCs or other folding frames which need to rotate the display module from setting two fasteners on both sides of the display module. This advantage simplifies the design and decreases the cost.

Figure 1:
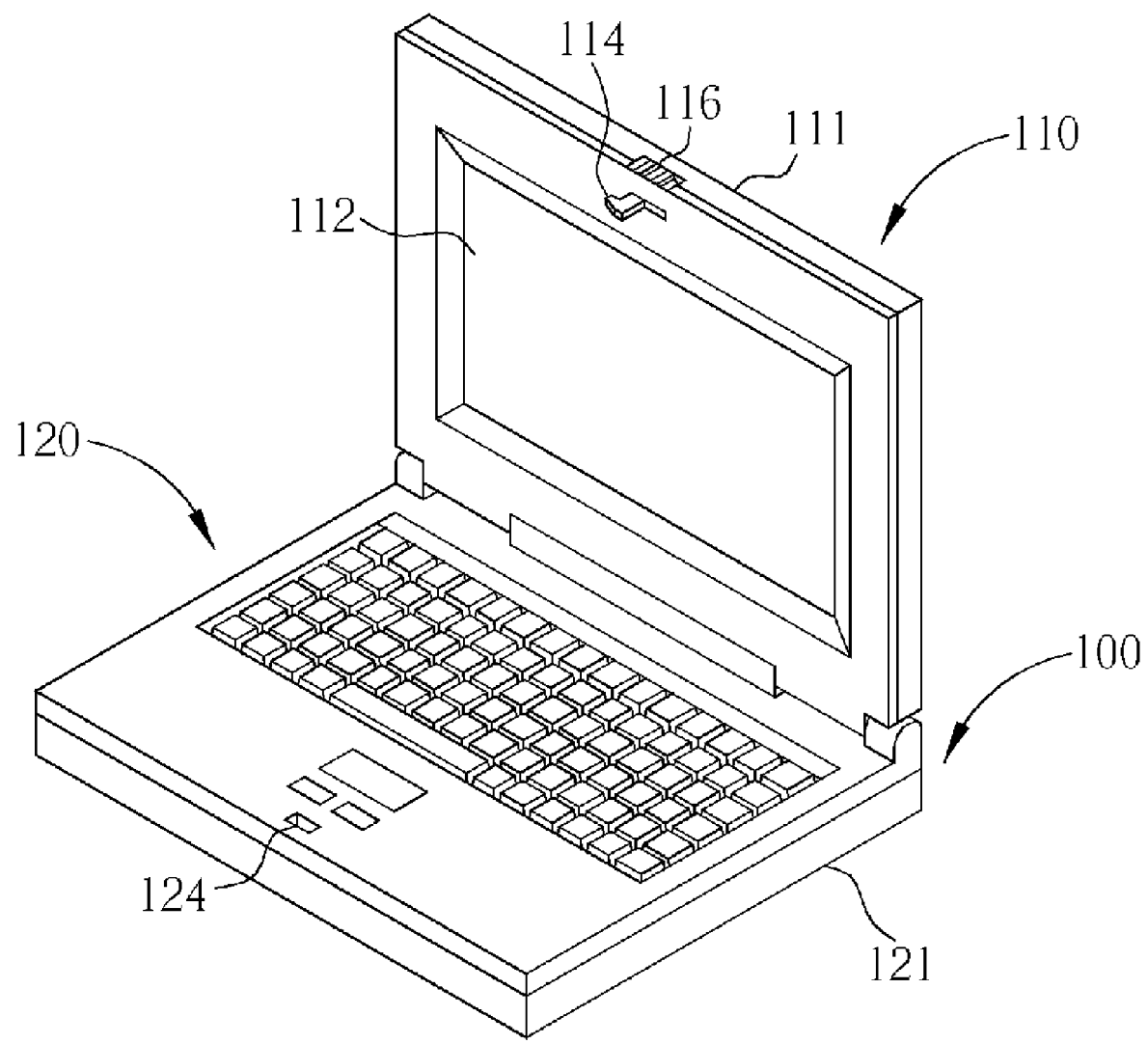
FIG. 1 is a perspective diagram of a prior art notebook computer.
Figure 2:
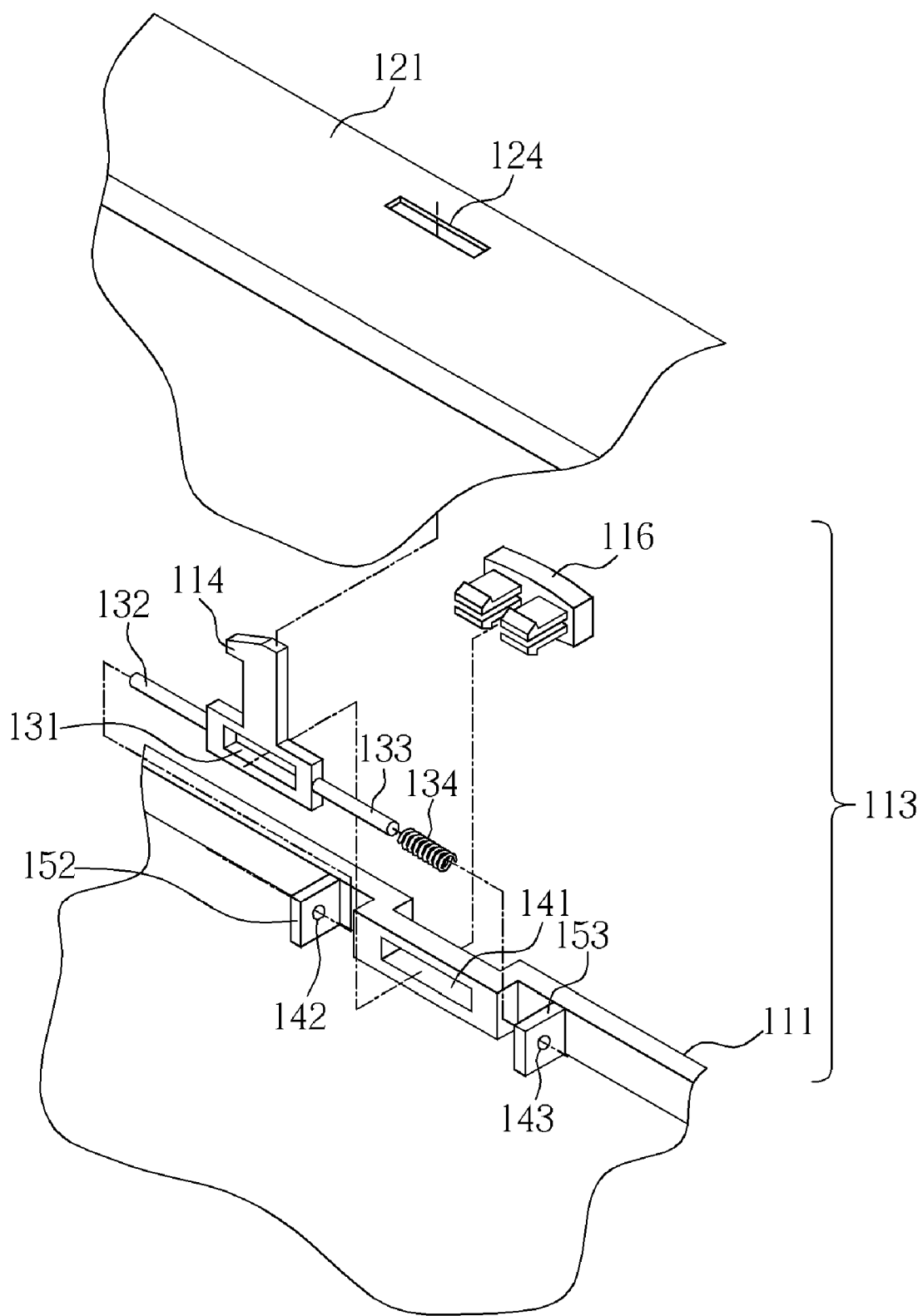
FIG. 2 is an exploded perspective part diagram of the prior art notebook computer.
Figure 3:
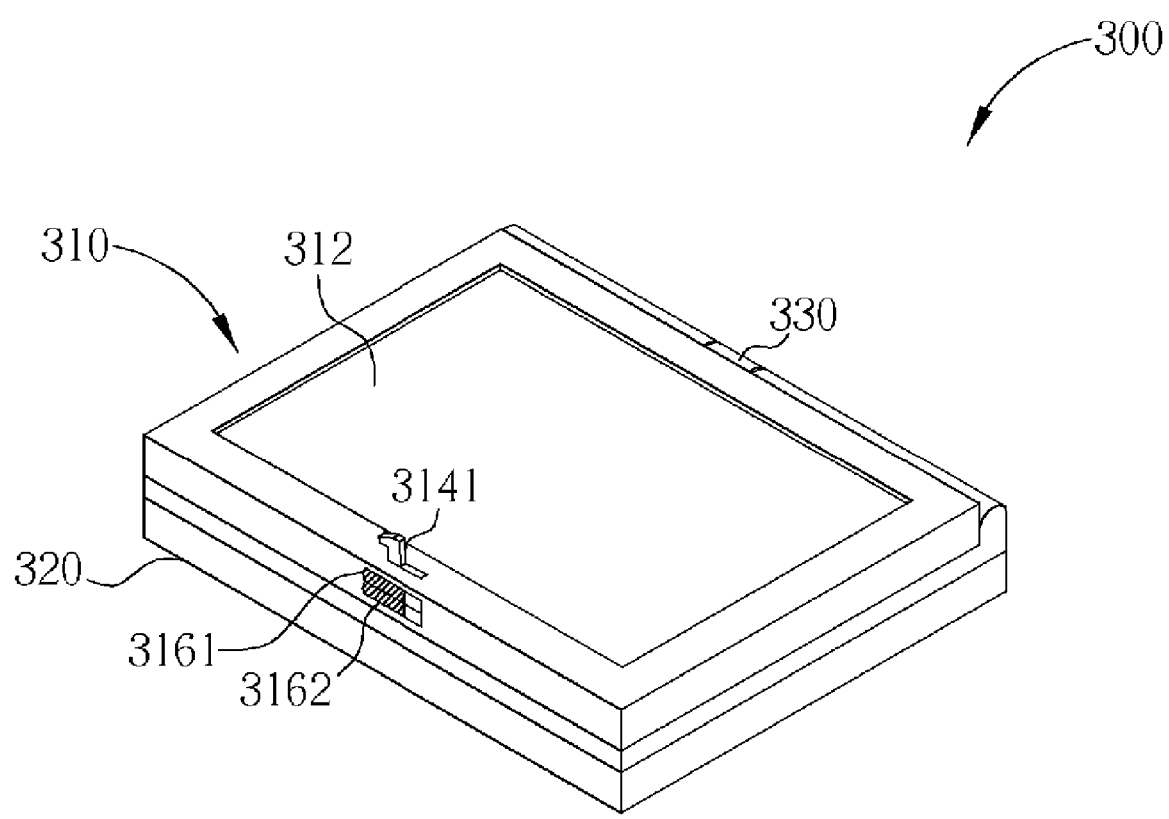
FIG. 3 a perspective diagram of a prior art portable PC.
Figure 4:
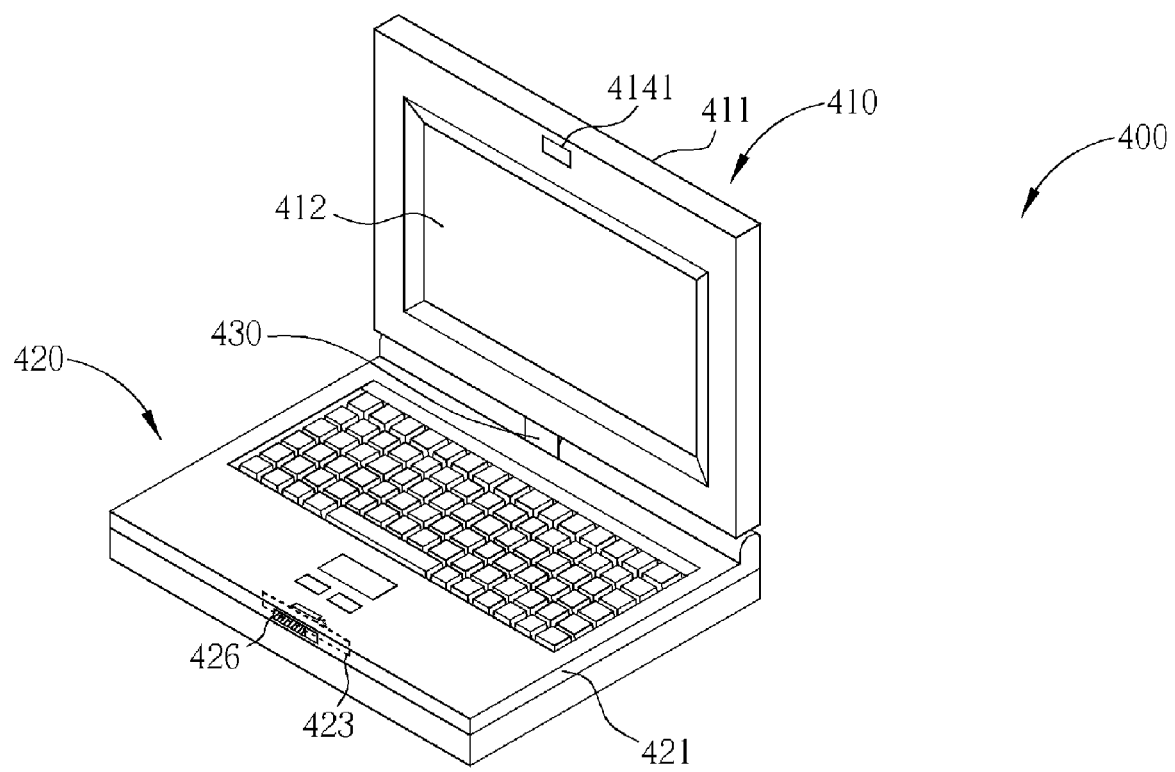
FIG. 4 is a perspective diagram of the present invention portable PC.

Please refer to FIG. 4. FIG. 4 is a perspective diagram of the present invention portable PC 400. 410 is a display module of the portable PC 400. 412 is a monitor. 420 is a system module of the portable PC 400. 411 is a housing of the display module 410. 421 is a housing of the system module 420. 430 is a hinge connected the display module 410 and the system module 420, and the display module 410 can rotate around the hinge 430. A hook 424 is disposed on the housing 421 of the system module 420. The hook 424 is rotatably connected to the system module 420. A fastener 423 is utilized to push the hook 424 to rotate opposite to the system module 420. The fastener 423 is set inside the housing 421 and is not shown in FIG. 4, and the hook 424 is hidden inside the housing 421 and not shown in FIG. 4, either. 426 is a knob with one end outside the housing 421 and another end connected with the fastener 423. A fixing device 4141 and a fixing device 4142 are disposed on two sides of the housing 411 separately at locations comparative to the hook 424, wherein the fixing device 4142 is located on the back side of the monitor 412 and is not shown in FIG. 4. When the portable PC 400 is closed to connect the monitor 412 to the system module 420, the hook 424 will engage with the fixing device 4141 and fasten the display module 410 and the system module 420. When the portable PC 400 is closed with the monitor 412 exposed, the hook 424 will engage with the fixing device 4142 and also fasten the display module 410 and the system module 420.

Figure 5:
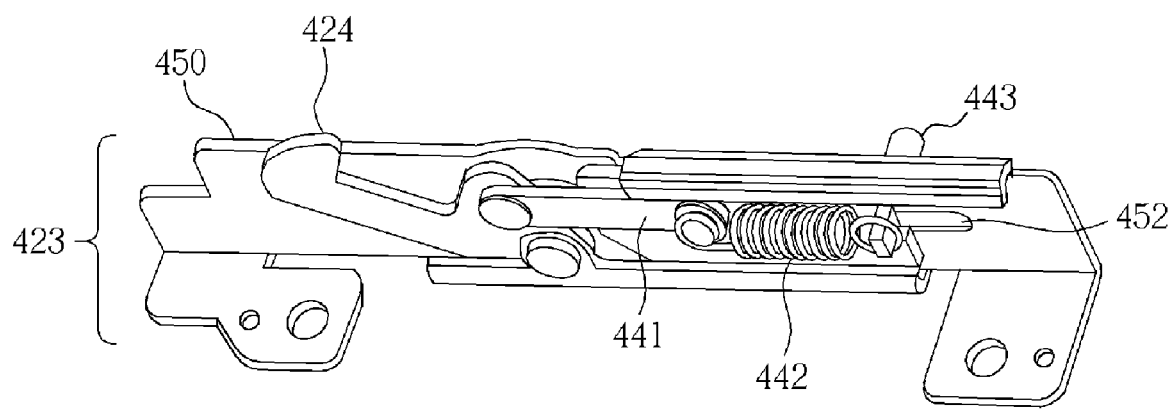
FIG. 5 is a perspective diagram of the present invention hook and fastener.
Figure 6:
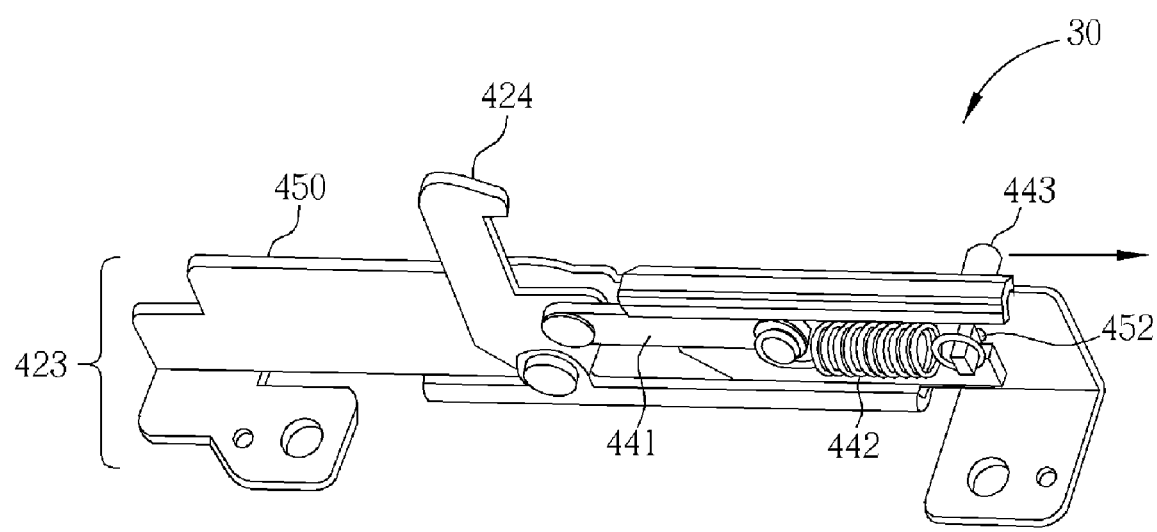
FIG. 6 is a perspective diagram of the present invention hook and fastener with the hook protruding.

Please refer to FIG. 5. FIG. 5 is a perspective diagram of the hook 424 and the fastener 423 of the portable PC 400. The hook 424 is of a substantially rectangular shape with a hooked end. The shape of the hook 424 is similar to the shape of the conventional hook. The fastener 423 includes a shaft 441, a spring 442 and a latch pin 443. As illustrated in FIG. 5, one end of the shaft 441 is connected with the hook 424 and another end of the shaft 441 is connected with the spring 442. One end of the latch pin 443 is connected to the spring 442, and another end of the latch pin 443 is connected to the knob 426 (not shown in FIG. 5). 450 is a latch holder, on which the hook 424 and the fastener 423 are disposed. The latch holder 450 is further assembled on the housing 421 of the system module 420. However, the hook 424 and the fastener 423 can also be disposed on the housing 421 directly, so the latch holder 450 is not needed in that case. There is a slit 452 included in the latch holder 450. The end of the latch pin 443 that connects to the spring 442 passes through the slit 452. The latch pin 443 is capable of moving the spring 442 forward along the slit 452. Please refer to FIG. 6. FIG. 6 is a perspective diagram of the hook 424 and the fastener 423 illustrated in FIG. 5 when the hook 424 is extended. When the knob 426 is pushed toward the right, the latch pin 443 follows the knob 426, pulls the spring 442 and the shaft 441 forward accordingly and makes the hook 424 rotate to extend from the housing 421 of the system module 420. If the folding frame is shut, the hook 424 thus inserts into the fixing device (the fixing device 4141 or the fixing device 4142) on the side of the display module that faces inward for fastening the two bodies together. When the knob 426 is pushed toward ward the left, the latch pin 443 follows the knob 426, allowing the spring 442 and the shaft 441 to move according thus making the hook 424 rotate to hide within the housing 421 of the system module 420. If the hooked end of the hook 424 is engaged with the fixing device, the hook 424 will be unhooked from the fixing device to disconnect the two bodies of the folding frame.

Figure 7:
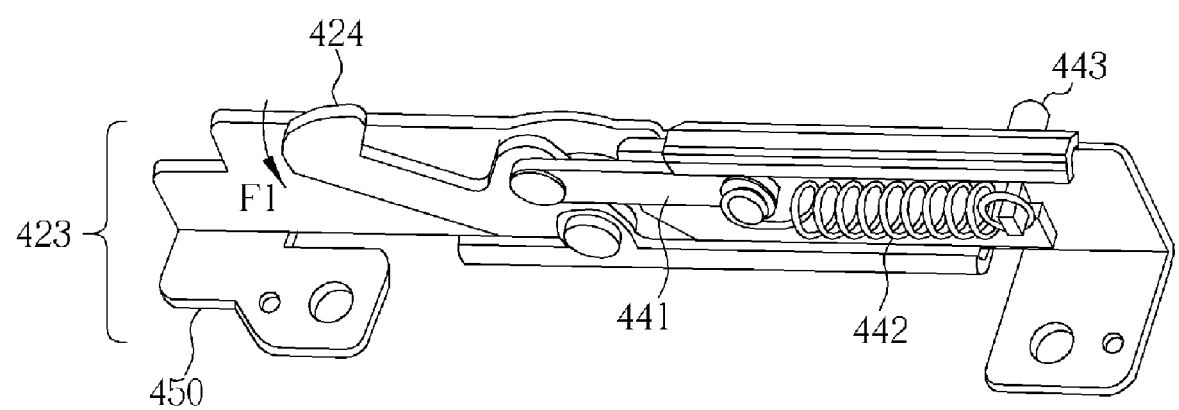
FIG. 7 is a perspective diagram of the present invention hook and fastener.

When the hook of the present invention is exposed outside the housing but experiences an external force, or the hook gets stuck in the housing for some reason while the knob is pushed violently, the design of the spring in the present invention can save the hook of the fastener from damage. Please refer to FIG. 7. FIG. 7 is a perspective diagram of the hook 424 and the fastener 423 while an external force F1 exists. The hook 424 illustrated in FIG. 7 is rotated downward by the external force F1. However, the latch pin 443 is stuck at the position so that it provides a pulling force to the hook 424. As shown in FIG. 7, the shaft 441 moves to the left along with the rotation of the hook 424, the end of the spring 442 that connects to the shaft 441 also moves to the left along with the shaft 441, but the other end of the spring 442 that connects to the latch pin 443 remains at its original position. The spring 442 is stretched out by the external force F1 and the latch pin 443 accordingly. Without the utilization of the spring 442 in the present invention, if the latch pin 443 were to become stuck and not able to move along with the rotation of the hook 424, the hook 424 would be broken by the external force F1. If the external force F1 is not less than the restoring force of the spring 442, the hook 424 and the fastener 423 remains in the state illustrated in FIG. 7. However, if the external force F1 is smaller than the restoring force of the spring 442, the spring 442 retracts and brings the hook 424 and the fastener 423 to the normal position. Similarly, when the hook 424 is stuck in the housing and cannot be rotated outward while the knob is pushed by a violent external force F2 (not shown in FIG. 7), the hook 424 and the fastener 423 are saved from being broken by the spring 442.

Figure 8:
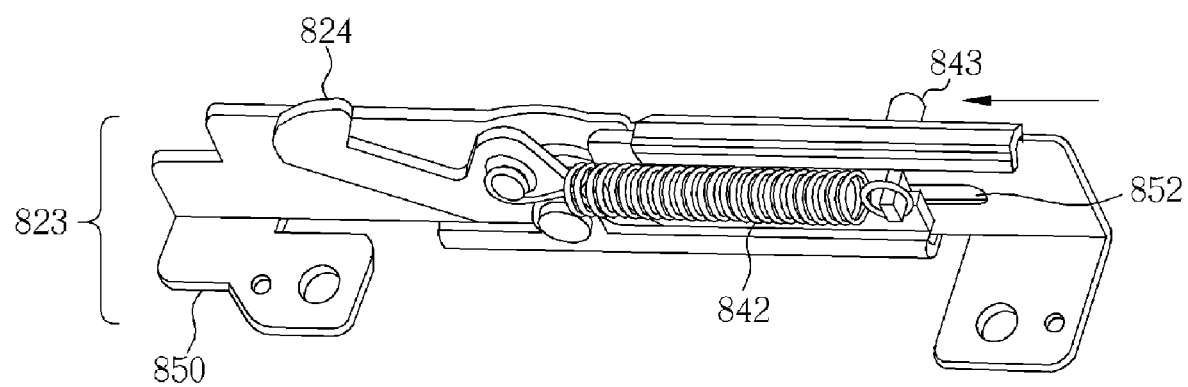
FIG. 8 is a perspective diagram of a second embodiment of the present invention hook and fastener.

Please refer to FIG. 8. FIG. 8 is a perspective diagram of a second embodiment of the present invention hook and fastener. 824 is a hook of the present invention. 823 is a fastener of the present invention. The fastener 823 includes a spring 842 and a latch pin 843. As demonstrated in FIG. 8, one end of the spring 842 is connected to the hook 824, and another end of the spring 842 is connected to the latch pin 843. The other end of the latch pin 843 is connected to a knob that is assembled on the housing of the module. 850 is a latch holder comprising a slit 852. The end of the latch pin 843 that connects to the spring 842 passes through the slit 852 and is capable of pushing the spring 842 forward along the slit 852. When the knob is pushed toward the right, the latch pin 843 follows the knob, moves the spring 842 forward accordingly, and makes the hook 824 rotate out from the housing of the system module. If the folding frame is shut, the hook 824 inserts into the fixing device on the side of the display module that faces inward for fastening the two bodies together. Similarly, when the knob is pushed towards the left, the latch pin 843 follows the knob, pushes the spring 842 forward accordingly, and makes the hook 824 rotate to be hidden inside the housing of the system module. If the hooked end of the hook 824 is engaged with the fixing device, the hook 824 will be unhooked from the fixing device and make the two bodies of the folding frame able to be separated. The advantage of preventing the hook from being broken by external forces is also provided in this embodiment.

The fixing device of the present invention is an opening of simple structure. There is no need to thicken the display module for disposing fixing devices on both sides of the display module. The structure of the fastener is simpler than the fastener in the prior art, too. In order to increase the robustness of the engagement of the hook and the fixing device in the present invention, the fixing device of the present invention may include a magnet, and the hook may be made of magnetic metal. Therefore, when the hook inserts into the fixing device and engages with it, the magnetic force between the magnet and the hook makes the upper body and the lower body fasten even more tightly so that they are not easily separated by unexpected external force. Further, when the knob is pushed, a pushing force that is larger than the magnetic force between the hook and the fixing device can disengage the hook from the fixing device easily.

Comparing to the conventional fastening method, the present invention prevents the hook of the folding frame from being damaged by unexpected external force, and the uncomfortable feeling to users caused by the exposed hook is avoided. The present invention is applicable to folding frames that support fixing devices on both sides of a single module, such as portable PCs. The hook and the fastener of the present invention can be assembled on the housing of the system module, and the fixing device on each side of the display module housing. Contrarily, if one chooses to assemble the fixing device on the housing of the system module and dispose a set of a hook and a fastener on each side of the display module, this will still work since the hook is hidden in the housing when the folding frame is open. Besides the portable PC, the present invention can also be applied to notebook computers and electronic translators and other folding frames.

The present invention provides a folding frame that utilizes a rotatable hook for increasing the robustness of the closure of the upper body and the lower body of the folding frame. The present invention avoids the uncomfortable feeling resulting from the conventional hook remaining exposed from the housing. Further, the utilization of the spring included in the fastener prevents the hook from being broken when unexpected external force is brought to the knob or the hook. Applying the present invention, only one set of the hook and the fastener is needed to be assembled on the folding frame which supports fixing devices on both side of a single module, hence the cost is decreased.

Those skilled in the art will readily observe that numerous modifications and alterations of the device may be made while retaining the teachings of the invention. According, the above disclosure should be construed as limited only by the metes and bounds of the appended claims.

What is claimed is:

1. A folding frame with a rotatable hook comprising:
   an upper body;
   a lower body;
   a fixing device disposed on the upper body;
   a hook rotatably coupled to the lower body, wherein the hook is unhooked from the fixing device when the hook is rotated into the lower body and the hook is engaged with the fixing device when the hook is rotated out from the lower body;
   a fastener for rotating the hook opposite to the lower body comprising:
      a spring, wherein a first end of the spring is coupled to the hook; and
      a latch pin capable of moving the spring thereby rotating the hook, wherein a first end of the latch pin is coupled to a second end of the spring; and
   a knob connected to a second end of the latch pin, wherein the hook is rotated forward when the knob is moved.

2. The folding frame of claim 1 further comprising a slit, wherein the fastener slides along the slit for rotating the hook.

3. The folding frame of claim 1 wherein the second end of the latch pin is exposed outside the lower body.

4. The folding frame of claim 1 wherein the fixing device comprises a magnet, and the hook comprises a magnetic metal.

5. The folding frame of claim 1 wherein the upper body is a display module and the lower body is a system module.

6. The folding frame of claim 5 wherein the system module comprises:
   a central processing unit;
   a memory module;
   a wireless module for transmitting signals wirelessly; and
   a bus interface for receiving and/or outputting signals from/to another system.

7. The folding frame of claim 1 wherein the lower body is a display module and the upper body is a system module.

8. The folding frame of claim 7 wherein the system module comprises:
   a central processing unit;
   a memory module;
   a wireless module for transmitting signals wirelessly; and
   a bus interface for receiving and/or outputting signals from/to another system.

9. The folding frame of claim 1 being a notebook computer.

10. The folding frame of claim 1 being a portable PC wherein the upper body is a display module and comprises a touch panel, the upper body connected to the lower body rotatably and with fixing devices set on both sides.

11. The folding frame of claim 1 being an electronic translator.

12. A folding frame with a rotatable hook comprising:
an upper body;
a lower body;
a fixing device disposed on the upper body;
a hook rotatably coupled to the lower body, wherein the hook is unhooked from the fixing device when the hook is rotated into the lower body and the hook is engaged with the fixing device when the hook is rotated out from the lower body; and
a fastener for rotating the hook opposite to the lower body, the fastener comprising:
a shaft, wherein a first end of the shaft is coupled to the hook;
a spring, wherein a first end of the spring is coupled to a second end of the shaft; and
a latch pin capable of moving the spring thereby moving the shaft for rotating the hook.

13. The folding frame of claim 12 wherein a first end of the latch pin is coupled to a second end of the spring and a second end of the latch pin is exposed outside the lower body.

14. The folding frame of claim 13 in which the second end of the latch pin is connected to a knob, wherein the hook is rotated forward when the knob is moved.

15. The folding frame of claim 12 further comprising a slit, wherein the fastener slides along the slit for rotating the hook.

16. The folding frame of claim 12 wherein the fixing device comprises a magnet, and the hook comprises a magnetic metal.

17. The folding frame of claim 12 wherein the upper body is a display module and the lower body is a system module.

18. The folding frame of claim 17 wherein the system module comprises:
a central processing unit;
a memory module;
a wireless module for transmitting signals wirelessly; and
a bus interface for receiving and/or outputting signals from/to another system.

19. The folding frame of claim 12 wherein the lower body is a display module and the upper body is a system module.

20. The folding frame of claim 19 wherein the system module comprises:
a central processing unit;
a memory module;
a wireless module for transmitting signals wirelessly; and
a bus interface for receiving and/or outputting signals from/to another system.

21. The folding frame of claim 12 being a notebook computer.

22. The folding frame of claim 12 being a portable PC wherein the upper body is a display module and comprises a touch panel, the upper body connected to the lower body rotatably and with fixing devices set on both sides.

23. The folding frame of claim 12 being an electronic translator.

* * * * *

UNITED STATES PATENT AND TRADEMARK OFFICE
CERTIFICATE OF CORRECTION

PATENT NO. : 6,965,512 B2
DATED : November 15, 2005
INVENTOR(S) : Huang et al.

It is certified that error appears in the above-identified patent and that said Letters Patent is hereby corrected as shown below:

<u>Title page,</u>
Item [73], Assignee, replace "Winstron Corporation" with -- Wistron Corporation --.

Signed and Sealed this

Twenty-third Day of May, 2006

JON W. DUDAS
*Director of the United States Patent and Trademark Office*